United States Patent [19]

Hasegawa

[11] Patent Number: 5,157,515
[45] Date of Patent: Oct. 20, 1992

[54] IMAGE READING APPARATUS USING A PLURALITY OF PHASE EXCITATION MODES

[75] Inventor: Yutaka Hasegawa, Kanagawa, Japan

[73] Assignee: Kabushiki Kaisha Toshiba, Kawasaki, Japan

[21] Appl. No.: 626,894

[22] Filed: Dec. 13, 1990

[30] Foreign Application Priority Data

Dec. 27, 1989 [JP] Japan .................. 1-336561

[51] Int. Cl.⁵ .............................. H04N 1/36
[52] U.S. Cl. .................... 358/412; 318/696; 355/56; 355/243; 358/451
[58] Field of Search ............. 355/243, 55, 56, 58, 355/235; 318/696; 358/412, 451, 486

[56] References Cited

U.S. PATENT DOCUMENTS

| | | | |
|---|---|---|---|
| 4,476,421 | 10/1984 | Moriguchi | 318/696 |
| 4,490,664 | 12/1984 | Moriguchi | 318/696 |
| 4,540,927 | 9/1985 | Tanimoto | 318/696 |
| 4,555,653 | 11/1985 | Nawata et al. | 318/696 |
| 4,642,544 | 2/1987 | Furumura et al. | 318/696 |
| 4,917,460 | 4/1990 | Yamada et al. | 355/56 X |

FOREIGN PATENT DOCUMENTS 0062029 3/1986 Japan .

Primary Examiner—A. T. Grimley
Assistant Examiner—Robert Beatty
Attorney, Agent, or Firm—Foley & Lardner

[57] ABSTRACT

An image reading apparatus includes a reading unit for reading the image and a stepping motor for moving the reading unit. The stepping motor is excited and driven in one of a plurality of phase excitation modes each causing a different amount of movement per unit synchronizing signal. A phase excitation mode is selected from the plurality of phase excitation modes corresponding to an enlargement or reduction ratio of the image to alter the moving speed of the reading unit corresponding to the rotation speed of the stepping motor.

2 Claims, 5 Drawing Sheets

IMAGE READING APPARATUS USING A PLURALITY OF PHASE EXCITATION MODES

BACKGROUND OF THE INVENTION

1. Field of the Invention

The present invention relates to an image reading apparatus and reading method, and particularly relates to an image reading apparatus and reading method in which the enlargement or reduction ratio of the image can be set over a wide range.

2. Description of the Related Art

In generally, a conventional image reading apparatus can enlarge or reduce the image read from an original document, which is the object to be read, within a range of, for instance, 65–154%.

When enlarging or reducing the image read from an original document in this way, the scanning speeds of the image reading unit in both the main scanning direction and the secondary scanning direction must be altered. This is carried out by altering the moving speed of the image reading unit for the secondary scanning direction, which is the direction of paper transport, and by altering the position of the optical lens for the main scanning direction.

Moreover, an in recent years, image reading apparatus using digital methods have has been developed. This image reading apparatus can execute enlargement or reduction of the image read from the original document within the range of 50–400%.

In the conventional apparatus which enlarges or reduces images read from original documents within the range of 50–400%, data read in the main scanning direction can be electrically processed to effectively alter the scan rate. However, the secondary scanning direction is processed by altering the moving speed of the image reading unit.

For instance, when enlarging the image read from the original document to a magnification of 400%, the image reading unit moving speed becomes ¼ of that when the magnification is 100%. Since the frequency of the clock pulse for synchronizing the stepping motor which moves the image reading unit also becomes ¼, the image reading unit itself approaches its mechanical inherent frequency. As a result of this, the image reading unit itself nears or enters a state of resonance. This causes such problems as the generation of abnormal noise or the occurrence of randomness in the copied image.

Moreover, when the magnification is small, for example with magnification 50%, the image reading unit moving speed becomes greater. The stepping motor driving frequency for moving the image reading unit also becomes high. As a result, not only is discordant noise generated, but also there is the disadvantage that the moving torque at this time diminishes.

SUMMARY OF THE INVENTION

It is an object of the present invention to provide an image reading apparatus and reading method in which good image reading unit movement can be executed even when the enlargement or reduction ratio is set within a wide range.

According to the present invention there is provided an image reading apparatus comprising a unit for reading the image; a stepping motor for moving the reading unit; a unit for generating a series of synchronizing signals; a unit for operating the stepping motor, the operating unit having a plurality of phase excitation modes, with each mode operating the stepping motor for a different amount of movement for a selected synchronizing signal; a unit for designating a ratio for enlargement or reduction of the image read by the reading unit; and a unit for selecting one of the plurality of phase excitation modes corresponding to the ratio designated by the designating unit.

Further, according to the present invention there is provided a method for obtaining an enlarged or reduced image by using a reading unit operatively connected to a stepping motor for moving the reading unit, the reading unit reading the image, the method comprising steps of designating a ratio for enlargement or reduction of the image read by the reading unit; selecting one of a plurality of phase excitation modes corresponding to the ratio designated; generating a series of synchronizing signals; and operating the stepping motor by using one of the plurality of phase excitation modes, each mode operating the stepping motor for a different amount of movement for a selected synchronizing signal.

DETAILED DESCRIPTION OF THE PREFERRED EMBODIMENTS

Figure 1:
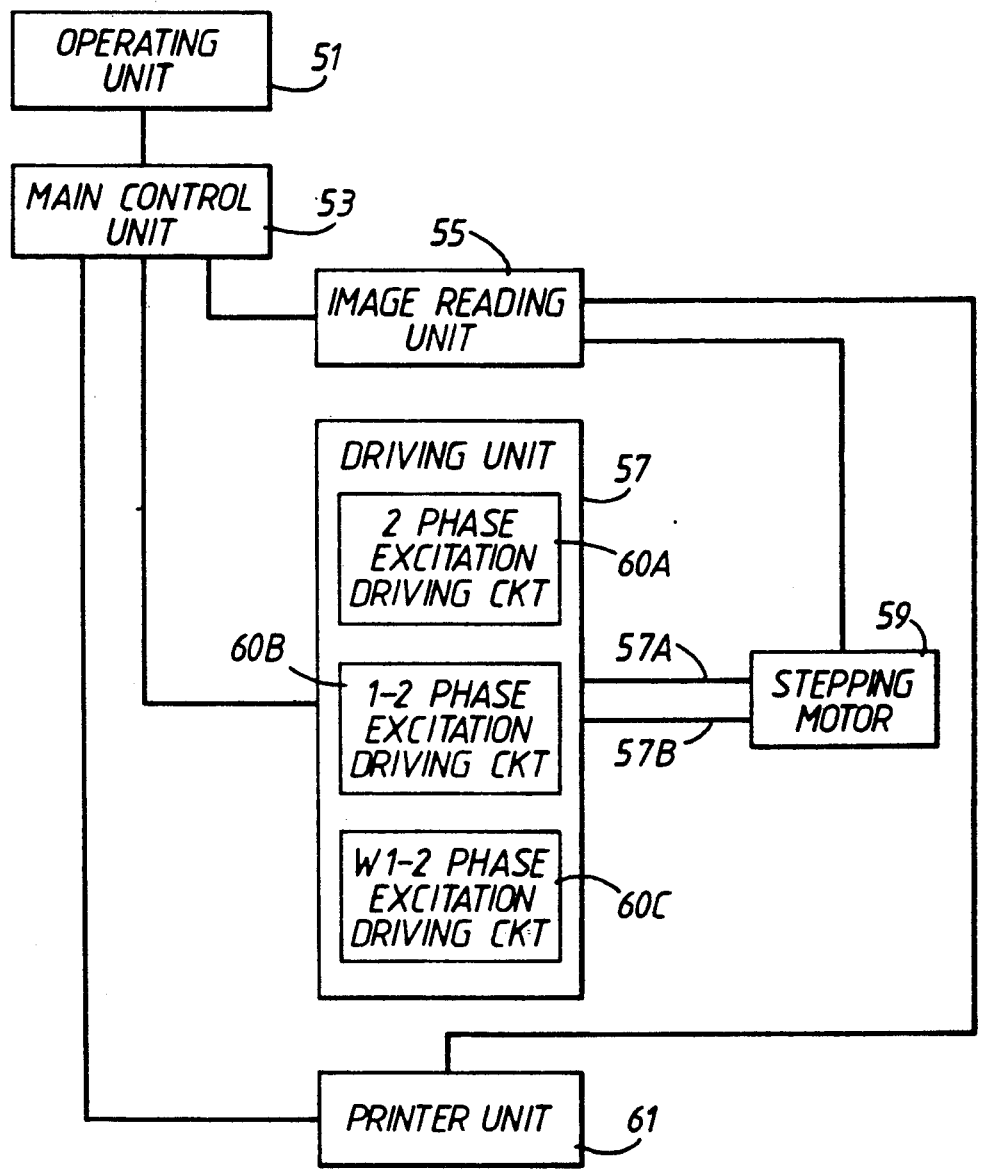
FIG. 1 is a block diagram showing an embodiment of the present invention.

Referring to the accompanying drawings, a detailed description will subsequently be given of the preferred embodiment of the present invention.

The overall construction of the image reading apparatus is described with reference to FIG. 2.

Original document table 2, formed of a glass plate on which to place the original document, and original document cover 3, which is free to open and close on top of original table 2, are provided on the top of main body 1.

Illuminating lamp 5 is used for irradiating light onto the original document, and reflector 6 is provided as a reflecting mirror which condenses the light from illuminating lamp 5 on the original document surface. The light reflected from the original document surface is incident on lens 9 via mirrors 7, 8a and 8b. The light which passes through lens 9 is supplied to photoelectric converter 11 via mirrors 10a and 10b.

Illuminating lamp 5 and mirror 7 are provided so that they are free to be moved forward and backward in the transverse direction, that is, in the secondary scanning direction, by a stepping motor which is not shown.

Mirrors 10a, 10b and lens 9 are respectively shifted to a prescribed position by other stepping motors (not shown) To be precise, the design is that a spiral shaft (not shown) is rotated by the stepping motor, and lens 9 is shifted to the prescribed position in the optical axis direction by the movement of this spiral shaft.

Mirrors 8a and 8b move in the same direction as illuminating lamp 5 and mirror 7 but at half speed. By this means, the length of the optical path to lens 9 is set at a specified value when illuminating lamp 5 scans the surface of the original document.

Lens 9 has a fixed focal length and is designed to be shifted to the prescribed position in the optical axis direction according to the value of the ratio for enlargement or reduction of the image of the original document when this ratio is designated by the designating unit.

The pair of mirrors 10a and 10b change their position according to the shifting of lens 9 which corresponds to the ratio designated, and the light from lens 9 is led to photoelectric converter 11 by altering the light path of this light.

Photoelectric converter 11 converts the reflected light from the original document into electrical signals. That is, photoelectric converter 11 separates and outputs the image of the original document as color signals of cyan, green, and yellow (or red, green and blue) light by photoelectric conversion. It is mainly composed of, for instance, a CCD type line image sensor.

Platen drum 22 is positioned in the approximate center of main body 1. The periphery of platen drum 22 is composed of an elastic material such as rubber, and has the function of acting as the platen roller for thermal head 24. Also, gripper 23 is provided on the surface of platen drum 22. When gripper 23 grips the leading edge of paper P supplied from paper supply cassette 20, paper P is wound around platen drum 22 by the rotation of platen drum 22 in the clockwise direction. Moreover, pressure rollers 25 are arranged at specified intervals on the periphery of platen drum 22 so that paper P does not rise up. Furthermore, the circumference of platen drum 22 is set slightly longer than the longitudinal length of the largest size of paper P which may be used.

Thermal head 24 which is positioned diagonally to the left below platen drum 22 is installed on a radiator. Ink ribbon 26 is sandwiched between thermal head 24 and platen drum 22. The spools of ink ribbon 26 are linked to the drive shaft of a motor (not shown) through a drive transmission mechanism (not shown), and are designed to be rotated when required.

Paper supply cassette 20 which houses paper P is mounted in main body 1 so that it can be freely installed or removed. Paper supply roller 41 extracts paper P, which is housed in paper supply cassette 20, sheet by sheet. Paper P which has been extracted by paper supply roller 41 is transported to platen drum 22 via transport rollers 42, aligning rollers 21 and guide plates 43.

Manual paper supply device 46 is for the manual supply of paper P, and paper P supplied from manual paper supply device 46 is also similarly transported to platen drum 22 via aligning rollers 21 and guide plates 43.

When paper P which is wound around platen drum 22 is transported to the printing area, that is, between thermal head 24 and platen drum 22, thermal head 24 is pressed onto platen drum 22 and printing is executed.

The printing process for the first color will be completed when platen drum 22 has rotated approximately one revolution. At this time, the pressure on thermal head 24 is temporarily released and ink ribbon 26 is wound on so that the next color starts to appear.

Then, platen drum 22 rotates once more in the clockwise direction, printing is executed by themral head 24 and thus the next color is overprinted.

In this way, in the case of full-color copying, overprinting is executed four times corresponding to the respective colors yellow, magenta, cyan and black. Also, in the case of the three colors yellow, magenta and cyan being printed, overprinting is executed three times. In the case of a single color, such as black, being printed, the printing operation is executed once.

Guide plates 27a and 27b and paper receiving tray 28 are provided to the left of platen drum 22.

When paper P on which all the printing processes for the colors have been completed is dispensed to paper receiving tray 28, platen drum 22 rotates in the clockwise direction until the trailing edge of paper P arrives at guide plate 27a. When the trailing edge of paper P has arrived at guide plate 27a, paper P is guided to guide plate 27a by rotating platen drum 22 in the anticlockwise direction. At the same time the trailing edge of paper P is peeled from platen drum 22 by a peeling claw (not shown). At this time, the leading edge of paper P is released from gripper 23 so that paper P is dispensed to paper receiving tray 28.

Figure 2:
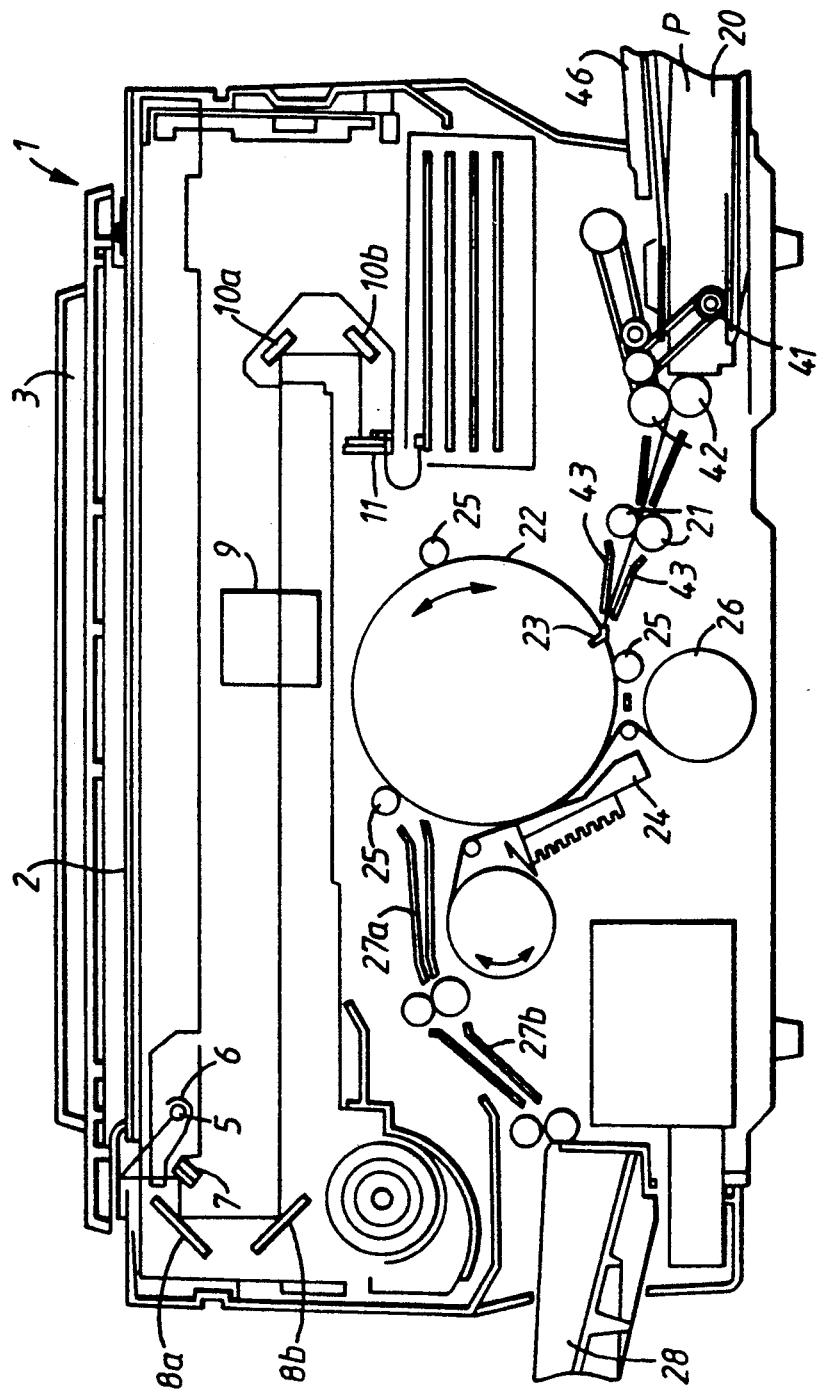
FIG. 2 is a side view of the image reading apparatus concerned in the present invention.

The following is a description of the circuit incorporated in the image reading apparatus shown in FIG. 2, with reference to FIG. 1.

Operating unit 51 has various switches such as a switch for designating the ratio for enlargement or reduction of the image of the original document as a designating unit.

Main control unit 53 is connected to operating unit 51 and, at the same time, is connected to each of image reading unit 55 and driving unit 57. When information concerning the ratio for the enlargement or reduction of image is inputted from control unit 51, main control unit 53 controls image reading unit 55 and driving unit 57 in response to this information concerning the ratio.

Image reading unit 55 comprises illuminating lamp 5 and mirror 7, and these are moved by stepping motor 59 when it reads the image of the original document.

Stepping motor 59 is driven in synchronisation with a synchronizing signal such as a clock pulse. The amount of movement of stepping motor 59 per unit synchronizing signal differs according to the excitation mode by which it is excited by driving unit 57.

Driving unit 57 includes three types of driving circuits for exciting stepping motor 59. That is, while always exciting with 2 phases, for instance phase A and phase B, it has a 2 phase excitation driving circuit 60A which drives stepping motor 59, a 1-2 phase excitation driving circuit 60B which drives stepping motor 59 by a 1-2 phase excitation mode which is an intermediate excitation mode of 1-phase excitation and 2-phase excitation, and a W1-2 phase excitation driving circuit 60C which drives stepping motor 59 by a W1-2 phase excitation mode.

Main control unit 53 selects the appropriate driving circuit from the three types of driving circuit in driving unit 57 in response to information concerning the ratio for enlargement or reduction inputted from operating unit 51. In driving unit 57, the driving circuit selected by main control unit 53 supplies A-phase current to stepping motor 59 via connecting wire 57a and, at the same time, supplies B-phase current to stepping motor 59 via connecting wire 57b.

Printer unit 61 comprises thermal head 24, etc., and forms images in response to information read by image reading unit 55.

The appropriate driving circuit which is selected from the three types of driving circuit incorporated in driving unit 57 in response to the ratio for enlargement or reduction is described with reference to FIG. 3.

Figure 3:
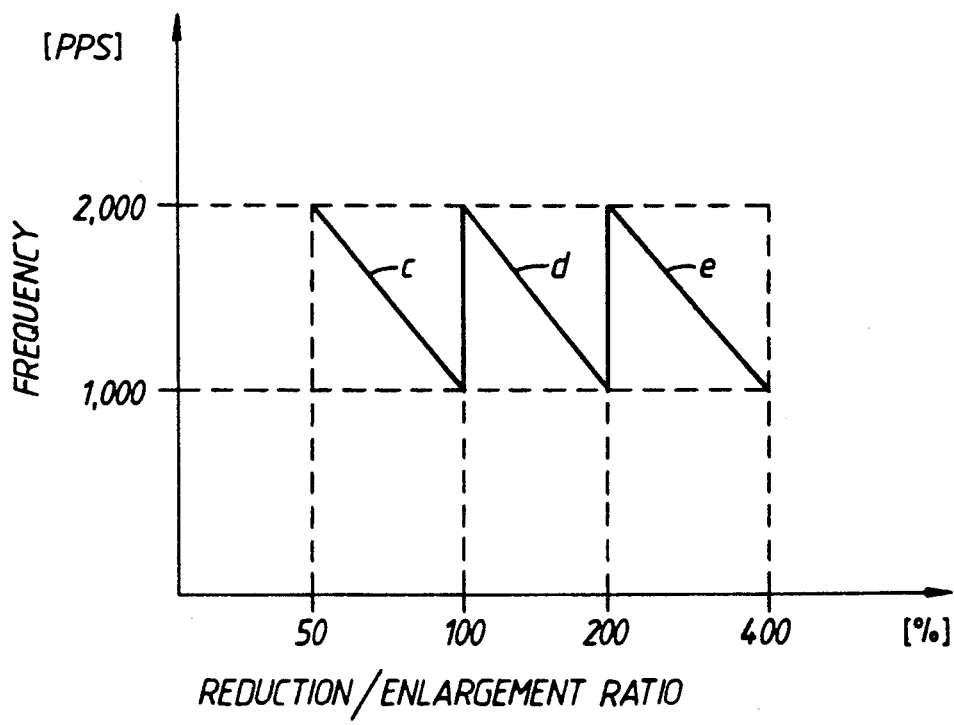
FIG. 3 is characteristic curves showing the pulse frequency characteristics of the clock pulses for the enlargement or reduction ratios of an embodiment of the present invention.

As shown by straight line c in FIG. 3, in the range in which the ratio is 50-99%, 2 phase excitation driving circuit 60A which uses the 2 phase excitation mode is selected. Also, as shown by straight line d in FIG. 3, in the case when the ratio is in the range of 100-199%, the 1-2 phase excitation driving circuit 60B which uses the 1-2 phase excitation mode is selected. Moreover, as shown by straight line e in FIG. 3, when the ratio is in the range of 200-400%, W1-2 phase excitation driving circuit 60C which uses the W1-2 phase excitation mode is selected.

The respective excitation modes of driving circuits 60A, 60B and 60C are explained with reference to FIGS. 4 to 6.

Figure 4:
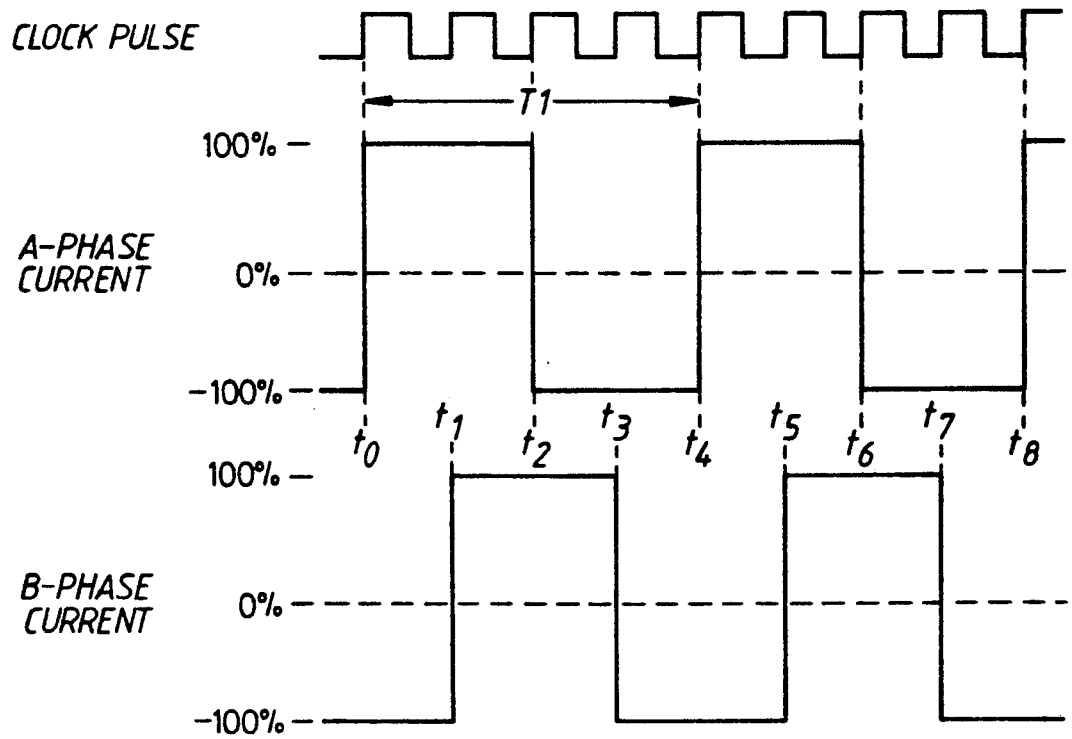
FIG. 4 is a signal wave-form diagram for the case of excitation for the stepping motor by the 2 phase excitation mode.

FIG. 4 shows waveform diagrams for each type of signal outputted from 2 phase excitation driving circuit 60A using the 2 phase excitation mode. In period T1 which is from time $t_0$ to time $t_4$, 4 (four) clock pulses are supplied to stepping motor 59. Also, from time $t_0$ to time $t_1$, 100% A-phase current is supplied to stepping motor 59 via connecting wire 57a. At the same time, $-100\%$ B-phase current is supplied to stepping motor 59 via connecting wire 57b. During the next period from $t_1$ to time $t_2$, 100% A-phase current and B-phase current are supplied to stepping motor 59 at the same time. Also, during the next period from time $t_2$ to time $t_3$, $-100\%$ A-phase current is supplied to stepping motor 59. At the same time, 100% B-phase current is supplied to stepping motor 59. In the following period from time $t_3$ to time $t_4$, both $-100\%$ A-phase current and B-phase current are supplied to stepping motor 59.

Thereafter, every time a period corresponding to a pulse-width of a clock pulse elapses, the current values of the A-phase current and the B-phase current are altered and supplied to stepping motor 59.

Figure 5:
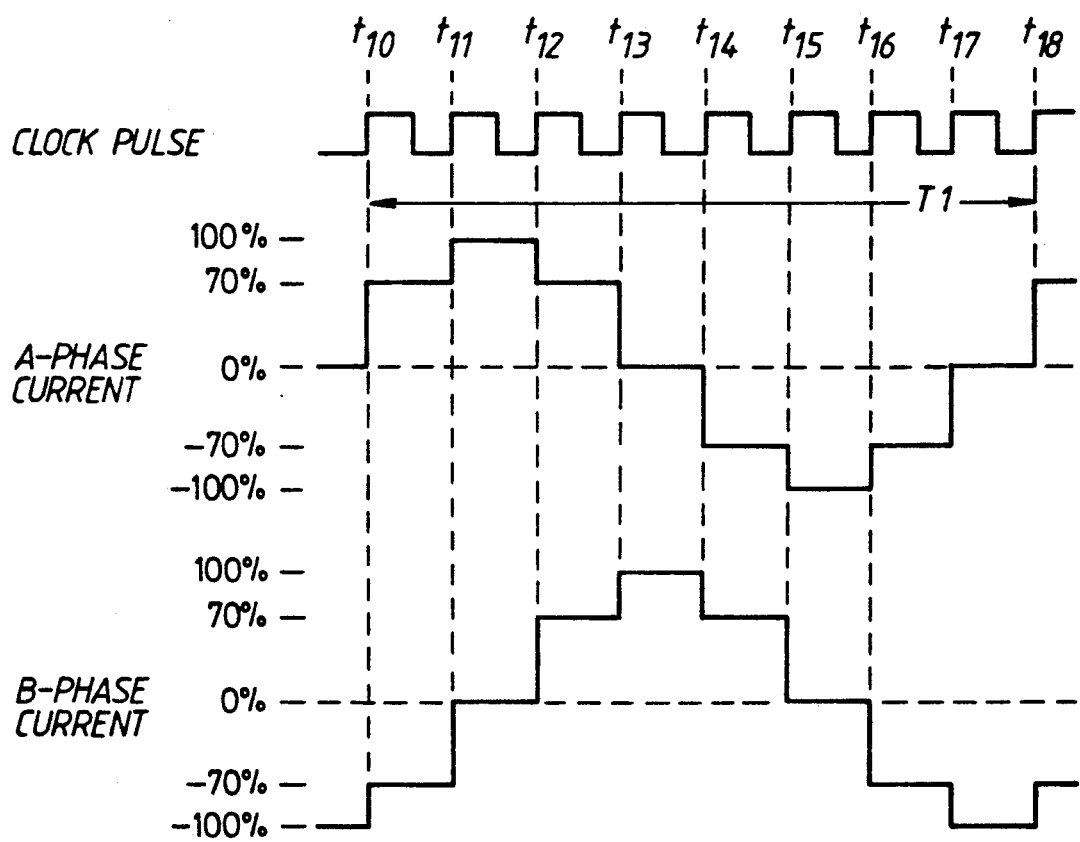
FIG. 5 is a signal wave-form diagram for the case of excitation for the stepping motor by the 1-2 phase excitation mode.

FIG. 5 shows waveform diagrams for each type of signal outputted from 1-2 phase excitation driving circuit 60B using the 1-2 phase excitation mode. In period T1 which is from time $t_{10}$ to time $t_{18}$, 8 (eight) clock pulses are supplied to stepping motor 59. Also, from time $t_{10}$ to time $t_{11}$, 70% A-phase current is supplied to stepping motor 59 via connecting wire 57a. At the same time, $-70\%$ B-phase current is supplied to stepping motor 59 via connecting wire 57b. During the next period from $t_{11}$ to $t_{12}$, 100% A-phase current is supplied to stepping motor 59 while the B-phase current is set at 0 (zero) during the same time. Also, during the next period from time $t_{12}$ to time $t_{13}$, 70% A-phase current and B-phase current are both supplied to stepping motor 59 at the same time. Next, during the period from $t_{13}$ to $t_{14}$, the A-phase current is set at 0 (zero) while, at the same time, 100% B-phase current is supplied to stepping motor 59. During the next period from $t_{14}$ to $t_{15}$, $-70\%$ A-phase current is supplie to stepping, motor 59 while the 70% B-phase current is supplied to stepping motor 59 during the same time. Also, during the next period from time $t_{15}$ to time $t_{16}$, $-100\%$ A-phase current is supplied to stepping motor 59 while the B-phase current is set at 0 (zero) during at the same time. Next, during the period from $t_{16}$ to $t_{17}$, $-70\%$ A-phase current and B-phase current are both supplied to stepping motor 59 at the same time. During the next period from time $t_{17}$ to time $t_{18}$, A-phase current is set at 0 (zero) while, at the same time, $-100\%$ B-phase current is supplied to stepping motor 59.

Thereafter, every time a period correspondign to the pulse-width of a clock pulse elapses, the respective current values of the A-phase current and the B-phase current are altered and supplied to stepping motor 59.

Figure 6:
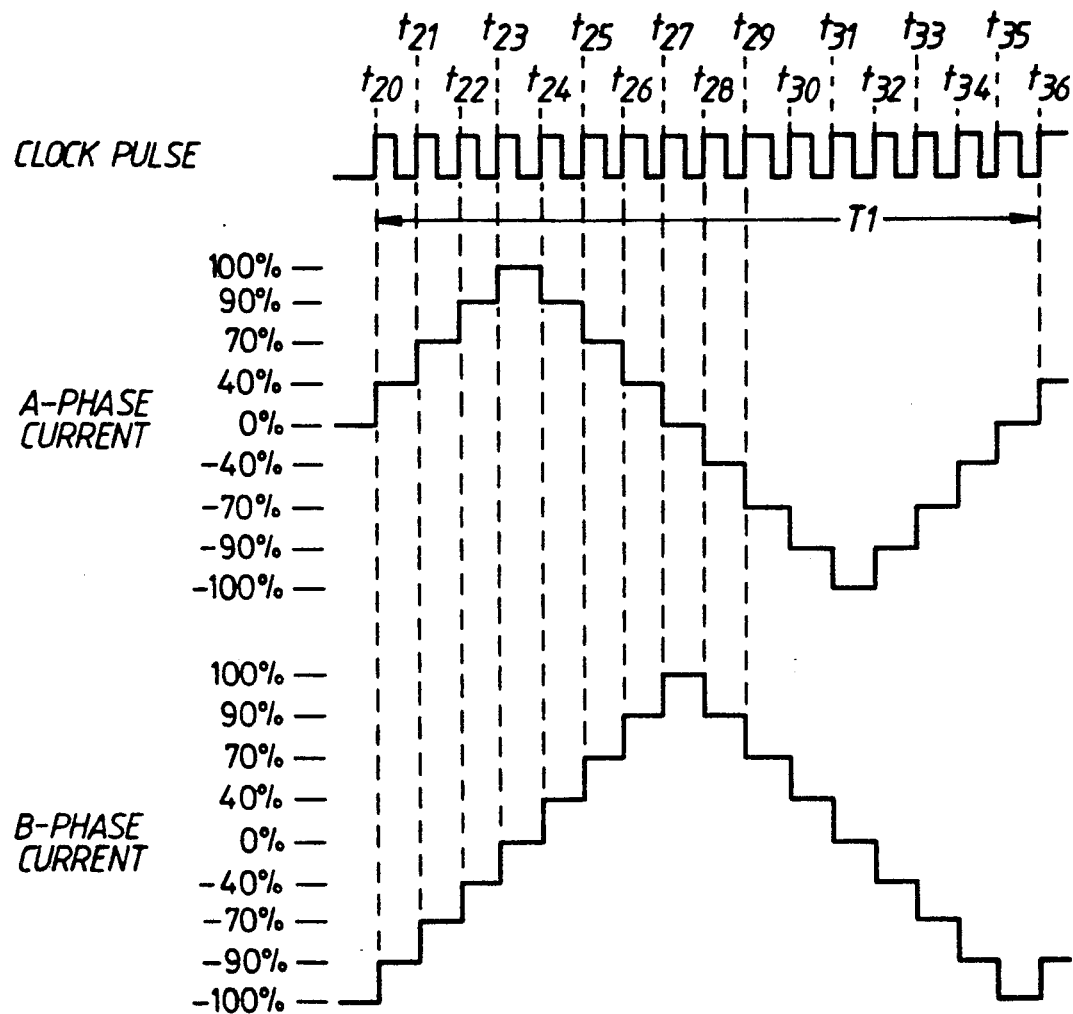
FIG. 6 is a signal wave-form diagram for the case of excitation for the stepping motor by the W1-2 phase excitation mode.

FIG. 6 shows waveform diagrams for each type of signal outputted from W1-2 phase excitation driving circuit 60C using the W1-2 phase excitation mode. In period T1 which is from time $t_{20}$ to time $t_{36}$, 16 (sixteen) clock pulses are supplied to stepping motor 59.

From time $t_{20}$ to time $t_{21}$, 40% A-phase current is supplied to stepping motor 59 via connecting wire 57a. At the same time, $-90\%$ B-phase current is supplied to stepping motor 59 via connecting wire 57b. In the next period from $t_{21}$ to $t_{22}$, 70% A-phase current is supplied to stepping motor 59 while, at the same time, $-70\%$ B-phase current is supplied to stepping motor 59. Also, during the next period, from time $t_{22}$ to time $t_{23}$, 90% A-phase current is supplied to stepping motor 59 and $-40\%$ B-phase current is supplied to stepping motor 59. Next, during the period from $t_{23}$ to $t_{24}$, 100% A-phase current is supplied to stepping motor while, at the same time, the B-phase current is set at 0 (zero). From time $t_{24}$ to time $t_{25}$, 90% A-phase current is supplied to stepping motor 59. At the same time, 40% B-phase current is supplied to stepping motor 59. In the next period from $t_{25}$ to $t_{26}$, 70% A-phase current and B-phase current are both supplied to stepping motor 59 at the same time. Also, during the next period, from time $t_{26}$ to time $t_{27}$, 40% A-phase current is supplied to stepping motor 59 and 90% B-phase current is supplied to stepping motor 59. Next, during the period from $t_{27}$ to $t_{28}$, the A-phase current is set at 0 (zero), 100% B-phase current is supplied to stepping motor while, at the same time.

From time $t_{28}$ to time $t_{29}$, $-40\%$ A-phase current is supplied to stepping motor 59 via connecting wire 57a. At the same time, 90% B-phase current is supplied to stepping motor 59 via connecting wire 57b. In the next period from $t_{29}$ to $t_{30}$, $-70\%$ A-phase current is supplied to stepping motor 59 while, at the same time, 70% B-phase current is supplied to stepping motor 59. Also, during the next period, from time $t_{30}$ to time $t_{31}$, $-90\%$ A-phase current is supplied to stepping motor 59 and 40% B-phase current is supplied to stepping motor 59. Next, during the period from $t_{31}$ to $t_{32}$, $-100\%$ A-phase current is supplied to stepping motor while, at the same time, the B-phase current is set at 0 (zero). From time $t_{32}$ to time $t_{33}$, $-90\%$ A-phase current is supplied to stepping motor 59. At the same time, $-40\%$ B-phase current is supplied to stepping motor 59. In the next period from $t_{33}$ to $t_{34}$, $-70\%$ A-phase current and B-phase current are both supplied to stepping motor 59 at the same time. Also, during the next period, from time $t_{34}$ to time $t_{35}$, $-40\%$ A-phase current is supplied to stepping motor 59 and $-90\%$ B-phase current is supplied to stepping motor 59. Next, during the period from $t_{35}$ to $t_{36}$, the A-phase current is set at 0 (zero), $-100\%$ B-phase current is supplied to stepping motor while, at the same time,.

Thereafter, every time a period corresponding to the pulse-width of a clock pulse elapses, the respective current values of the A-phase current and the B-phase current are altered and supplied to stepping motor 59.

In the 1-2 phase excitation mode shown in FIG. 5, the respective current values of the A-phase current and the B-phase current are set in four steps between −100% and +100%, and the current values are sequentially altered at every respective step. In the W1-2 phase excitation mode shown in FIG. 6, the respective current values of the A-phase current and the B-phase current are set in eight steps between −100% and +100%, and the current values are sequentially altered at every respective step.

Time T1 shown in FIGS. 4, 5 and 6 shows the time in which the image reading unit 55, which is moved by stepping motor 59, will move an equal, set distance. If the distance which image reading unit 55 moves during this period T1 is taken as, for instance, L, when 2 phase excitation driving circuit 60A which uses the 2 phase excitation mode shown in FIG. 4 is used, the reading unit 55 will move ¼ of the distance L per unit synchronizing signal, corresponding to one clock pulse of from time $t_0$ to time $t_2$.

Also, in the case of using 1-2 phase excitation driving circuit 60B which uses the 1-2 phase excitation mode shown in FIG. 5, ⅛ of the distance L is moved per unit synchronizing signal, that is, every period which corresponds to a clock pulse width of from time $t_{10}$ to time $t_{11}$.

Moreover, in the case of using W1-2 phase excitation driving circuit 60C, which uses the W1-2 phase excitation mode shown in FIG. 6, 1/16 of the distance L is moved per unit synchronizing signal, that is, for every time period corresponding to a clock pulse width.

Therefore, when stepping motor 59 is driven by 1-2 phase excitation driving 60B circuit using the 1-2 phase excitation mode, the moving distance of image reading unit 55 per unit synchronizing signal is set at half that when using 2 phase excitation driving circuit 60A which uses the 2 phase excitation mode.

Also, when stepping motor 59 is driven by W1-2 phase excitation driving circuit 60C using the W1-2 phase excitation mode, the moving distance of image reading unit 55 per unit synchronizing signal is set at half that when using 1-2 phase excitation driving circuit 60B which uses the 1-2 phase excitation mode.

The control of the moving speed of image reading unit 55 will now be described in the case when the ratio of reduction is designated at a value within the 50-99% range, that is, in the case when stepping motor 59 is driven by 2 phase excitation driving circuit 60A which uses the 2 phase excitation mode.

Main control unit 53 houses a timer circuit, and the timer time of this timer circuit is set in response to the value of the enlargement or reduction ratio which is set by operating unit 51. By introducing an interruption every time the timer time elapses, as shown in FIG. 3 with line c, the pulse frequency of the clock pulse varies within the range 2,000-1,000 [PPS] in response to a value of the reduction ratio of 50-90%. As a result, the moving speed of image reading unit 55 is controlled.

This type is control of the moving speed of image reading unit 55 is similar in the cases of driving stepping motor 59 by driving circuits using the other excitation methods. That is, 1-2 phase excitation driving circuit 60B varies the clock pulse frequency within the range of 2,000-1,000 [PPS] in response to enlargement ratio values of 100-199%, as shown in FIG. 3 with line d. W1-2 phase excitation driving circuit 60C also varies the clock pulse frequency within the range of 2,000-1,000 [PPS] in response to enlargement ratio values of 200-400%.

Next, the operation of the present invention is described.

When a reduction ratio of, for instance, 50% is designated by operating unit 51, main control unit 53 selects 2 phase excitation driving circuit 60A in driving unit 57. By this means stepping motor 59 is excited with the 2 phase excitation mode by 2 phase excitation driving circuit 60A. Also, main control unit 53 sets the clock pulse frequency at, for instance, 2,000 [PSS] corresponding to the reduction ratio 50% value. By this means, image reading unit 55 is moved at the appropriate moving speed corresponding to the reduction ratio 50% value.

When an enlargement ratio of, for instance, 100% is set by operating unit 51, main control unit 53 selects 1-2 phase excitation driving circuit 60B in driving unit 57. By this means stepping motor 59 is excited with the 1-2 phase excitation mode by 1-2 phase excitation driving circuit 60B. Also, main control unit 53 sets the clock pulse frequency at, for instance, 2,000 [PPS] corresponding to enlargement ratio 100%. By this means, image reading unit 55 is moved at the appropriate moving speed corresponding to enlargement ratio 100%.

When an enlargement ratio of, for instance, 400% is set by operating unit 51, main control unit 53 selects W1-2 phase excitation driving circuit 60C in driving unit 57. By this means stepping motor 59 is excited with the W1-2 phase excitation mode by W1-2 phase excitation driving circuit 60C. Also, main control unit 53 sets the clock pulse frequency at, for instance, 1,000 [PPS] corresponding to enlargement ratio 400%. By this means, image reading unit 55 is moved at the appropriate moving speed corresponding to enlargement ratio 400%.

As described above, the image reading apparatus is constructed so that the stepping motor excitation mode is selected in response to the ratio for enlargement or reduction of the image. Therefore, the pulse frequency of the clock pulse can be restricted within a specified range, and the prevention of generation of abnormal noise can guaranteed.

Since the construction is such that an appropriate excitation mode is selected out of a number of different types of excitation modes in response to the ratio designated by a designating means, even when the ratio for enlargement or reduction covers a wide range, the moving speed of the image reading unit can be appropriately controlled in response to the designated ratio.

What is claimed is:

1. An image reading apparatus comprising:
   means for reading said image;
   a stepping motor for moving said reading means;
   means for generating a series of synchronizing signals;
   means for operating said stepping motor, said operating means operating in a plurality of phase excitation modes, with each mode of said modes operating said stepping motor for a different amount of movement for a selected synchronizing signal, said plurality of phase excitation modes being produced respectively by a 2 phase excitation driving circuit, a 1-2 phase excitation driving circuit and a W1-2 phase excitation driving circuit;
   means for designating a ratio for enlargement or reduction of said image read by said reading means; and means for selecting one of said plurality of phase excitation modes corresponding to said ratio designated by said designating means;

said 2 phase excitation driving circuit driving said stepping motor when said designating means designates a reduction ratio;

said 1-2 phase excitation driving circuit driving said stepping motor when said designating means designates a first enlargement ratio; and said W1-2 phase excitation driving circuit driving said stepping motor when said designating means designates a second enlargement ratio larger than said first enlargement ratio.

2. The apparatus of claim 1, wherein said means for generating includes means for selecting a frequency of said synchronizing signal based on said ratio designated.

* * * * *